United States Patent [19]

Stol

[11] Patent Number: 4,519,866
[45] Date of Patent: May 28, 1985

[54] SURFACE-FASTENED FRANGIBLE ADHESIVE CAPSULE

[76] Inventor: Israel Stol, 639 Rocksprings Rd., Pittsburgh, Pa. 15228

[21] Appl. No.: 534,243

[22] Filed: Sep. 21, 1983

[51] Int. Cl.³ .............................................. B32B 31/00
[52] U.S. Cl. ..................................... 156/295; 156/250; 156/305; 206/620; 206/634; 206/813; 428/43; 428/306.6; 428/317.1; 428/317.7; 428/321.5
[58] Field of Search ..................... 428/43, 321.5, 306.6, 428/317.1, 317.7; 206/813, 620, 634; 156/295, 305, 250

[56] References Cited

U.S. PATENT DOCUMENTS

| | | |
|---|---|---|
| 2,292,024 | 8/1942 | Dreher . |
| 3,085,024 | 4/1963 | Blackford .............................. 428/43 |
| 3,408,250 | 10/1968 | Finefrock . |
| 3,425,889 | 2/1969 | Willits, Jr. . |
| 3,666,597 | 5/1972 | Parnell . |
| 3,861,979 | 1/1975 | Dzurilla et al. ...................... 156/295 |
| 3,962,504 | 6/1976 | Sherwin . |
| 4,076,774 | 2/1978 | Short . |
| 4,153,156 | 5/1979 | Seemann et al. ..................... 206/813 |
| 4,273,827 | 6/1981 | Sweeney et al. . |

Primary Examiner—Marion E. McCamish
Assistant Examiner—P. R. Schwartz
Attorney, Agent, or Firm—Cushman, Darby & Cushman

[57] ABSTRACT

A quantum of liquid adhesive is encapsulated in an ampule-like frangible capsule. An instrumentality is provided by which the adhesive-containing capsule may be temporarily secured on one surface of two objects which are to be adhered together in a surface-to-surface manner. For instance, a foraminous paper band is looped around the capsule and thumbtacked to one of the objects. Several similar adhesive-containing capsules may be similarly temporarily secured on one or the other of the objects, these capsules being distributed in a pattern calculated to cause sufficient adhesion of the two surfaces upon application of the adhesive thereto. Then the two objects are placed in surface-to-surface, confronting relationship and one of the objects is pressed toward the other, for instance by tapping its accessible side with a hammer everywhere that there is an adhesive-containing capsule disposed on the now inaccessible side. Thus, each capsule is broken and its adhesive spread in a patch between the two surfaces, adhering the two objects together.

8 Claims, 6 Drawing Figures

SURFACE-FASTENED FRANGIBLE ADHESIVE CAPSULE

BACKGROUND OF THE INVENTION

In modern construction, refurbishing and home improvement projects there are many instances where the surface of one object needs to be fastened to the surface of another so that the second object covers and is supported by the first. An example is where wallboard, plywood, signage, sub-floor, or other useful or decorative paneling or the like, is adhered to studs, to furring strips, to lath, to joists, or to an existing sidewall, ceiling or floor surface such as one made of plaster, wallboard, sheathing panels, particle board, cinder block or the like.

Many and various are the kinds, constituencies and formulations of the adhesives which may be and are used for adhering. Whole books are written on the subject, e.g. S. Skeist, e.d., *Handbook of Adhesives*, second edition, Van Nostrand Reinhold Company, New York 1977 (ISBN 0-442-27634-6). Of particular interest from this work are Chapter 49, R. J. Blomquist et al, "Adhesives for Building Construction", and Chapter 56, D. K. Rider, "Adhesives Guide for Designers". The patent literature is replete with teachings as to kinds, constituencies and formulations of adhesives, e.g. in T. J. Sweeney et al, U.S. Pat. No. 4,273,827, issued June 16, 1981.

The present invention has nothing to do with any new kind, constituency or formulation of adhesive, but simply with a new product and process which makes more convenient the use of many existing adhesives or ones hereafter developed for many instances where one object is to be adhered surfacewise to another.

Some adhesives in current use are very active, so that extreme caution is advised, for avoiding injury to the user. Potential problems include eye damage, skin burns, adhesion of clothing to the skin and of fingers to the work or to one another. Also a problem is inadvertent dripping, oozing, or running of adhesive onto finished surfaces, carpeting, furniture and the like in the vicinity of a do-it-yourself project, on into bearings or other moving parts of tools, power tools and machinery also being used on the project. Some do-it-yourselfers or potential do-it-yourselfers are believed to have a reluctance to engage in any project where they have to look at drops, beads or puddles of flowable liquid sticky material, perhaps out of the fear that they will get it on themselves, or otherwise make a mess that they do not want to have a clean up. What is needed is an adhesive applying means for the fastidious potential do-it-yourselfer, specifically a product that lets the user apply adhesive without ever having to look at it or worry about having to clean up a mess of it.

Some adhesives, e.g. cyanoacrylates such as those sold under the trade name "Superglue", which cure or set within five seconds or so upon exposure to air and/or upon being spread as a thin layer, are very difficult for one person to use working alone, especially where one large or heavy object needs to be stuck to a surface. The problem is that by the time the lone user gets a series of dots, beads, patches or a coat of the adhesive onto a sufficient area of one of the surfaces much of the adhesive is already substantially set, dry, reacted or the like and is no longer tacky or active. Accordingly, for such purposes, the quick-setting feature becomes a severe detriment rather than an advantage.

SUMMARY OF THE INVENTION

A quantum of liquid adhesive is encapsulated in an ampule-like frangible capsule. An instrumentality is provided by which the adhesive-containing capsule may be temporarily secured on one surface of two objects which are to be adhered together in a surface to surface manner. For instance, a foraminous paper band is looped around the capsule and thumbtacked to one of the objects. Several similar adhesive-containing capsules may be similarly temporarily secured on one or the other of the objects, these capsules being distributed in a pattern calculated to cause sufficient adhesion of the two surfaces upon application of the adhesive thereto. Then the two objects are placed in surface-to-surface, confronting relationship and one of the objects is pressed toward the other, for instance by tapping its accessible side with a hammer everywhere that there is an adhesive-containing capsule disposed on the now inaccessible side. Thus, each capsule is broken and its adhesive spread in a patch between the two surfaces, adhering the two objects together.

The principles of the invention will be further discussed with reference to the drawing wherein preferred embodiments are shown. The specifics illustrated in the drawing are intended to exemplify, rather than limit, aspects of the invention as defined in the claims.

BRIEF DESCRIPTION OF THE DRAWING

In the Drawing

FIG. 4 is a cross-sectional view similar to FIG. 2, but showing a later stage, in which the capsule has been destroyed and the two objects adhered together;

DETAILED DESCRIPTION

Figure 1:
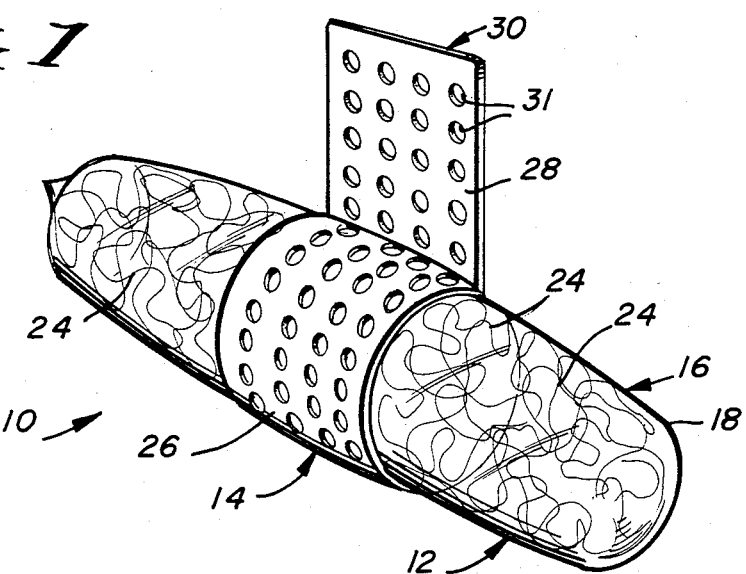
FIG. 1 is a perspective view of a surface fastenable frangible adhesive capsule embodying principles of the present invention.
Figure 2:
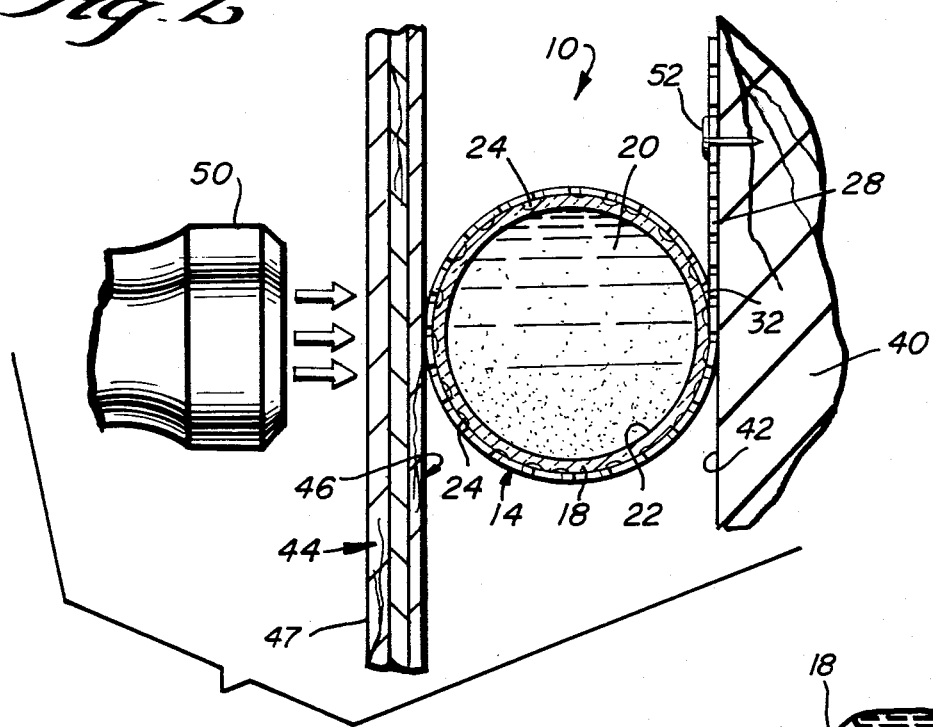
FIG. 2 is a vertical cross-sectional view of the adhesive capsule of FIG. 1 surface fastened to one object and confronted by a second object which is about to be compressed against the capsule to fracture the capsule and spread the adhesive between the two objects, thus adhering the two objects together.

A preferred form of the surface-fastenable frangible adhesive capsule product is illustrated at 10 in FIGS. 1 and 2. The product 10 is shown comprising two major parts, assembled together. These are the adhesive-filled frangible capsule 12 and the hanger 14.

The adhesive-filled frangible capsule 12 is shown including a macrocapsule per se 16 constituted by a liquid-tight, relatively thin wall means 18, which completely encloses a quantum of adhesive 20 which is in a liquid state. Although the wall means 18 could be made of many different sorts of materials, e.g. ceramic, natural or synthetic plastic resin, metal foil/paper laminate, plastic/foil laminate and the like, the presently preferred material is glass, particularly the same sorts of glass as are conventionally used in the manufacture of small, baseless, electric lightbulbs, and crushable ampules for therapeutic agents and other chemicals. And the technique used for filling then sealing the capsules may be substantially the same as is conventionally used for filling and sealing such ampules. An alternative material is hard gelatin capsules such as is used for encapsulating drugs, vitamins and the like, and the technique for filling and sealing can be substantially the same as is conventionally used for filling and sealing hard gelatin capsules with drugs, vitamins and the like. However, it is necessary when using such a material to first test whether the liquid adhesive will not attack the capsule wall leading to an unacceptably short shelf life for the product.

As to the liquid adhesive, no particular kind, composition or formulation is required for use in the product of the invention. It may be, as fluid as Superglue cyanoacrylate or as viscous a LePages library paste, or even more so in either extreme. Conventional polyvinyl acetate-based panel adhesive is another example of a useful adhesive. Virtually any adhesive which remains in a liquid state while isolated from the air or while in bulk and not as a thin film, and which is inert relative to the material of the capsule wall means may be used. Although each capsule 16 generally will have one internal chamber 22 filled with liquid adhesive, it would be possible to provide a plurality of internal chambers, at least two filled with different adhesive components, which would first come into contact upon breaking of the capsule.

Figure 3:
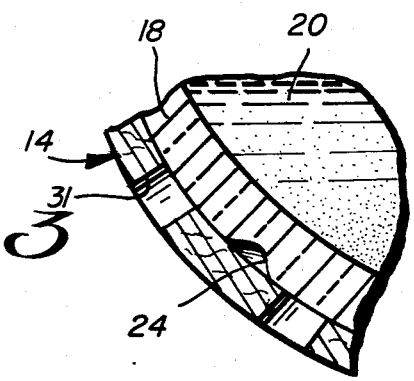
FIG. 3 is an enlarged scale fragmentary sectional view illustrating the preferable provision of weakness-line means in the capsule wall for aiding in comprehensive fragmentation of the capsule upon breakage of the capsule wall.
Figure 1:
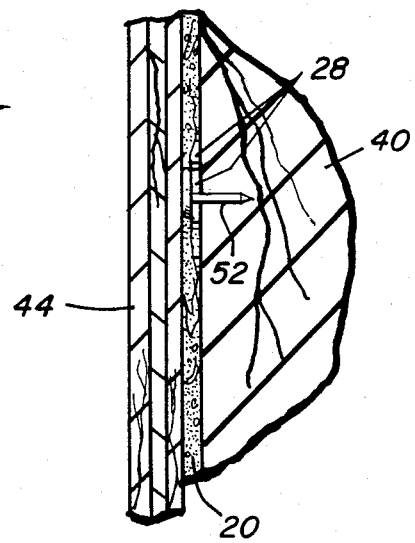

In accordance with the indication above, the preferred material for the capsule wall 18 is glass. In order to ensure that the capsule wall 18 will comprehensively disintegrate upon being compressed, and not merely rupture at one local site and permit the contents to spurt unidirectionally, the capsule wall preferably is provided with a pattern or network of lines of weakness 24 over substantially all or at least a major portion of its surface area. These may be provided internally or externally, but usually it will be easier to provide them externally. The lines of weakness 24 may be provided by casting or molding them into the material of the capsule wall much in the way that an orthogonal network of grooves is formed in the cast iron jacket of a fragmentation grenade. Or they may be formed, e.g. after the capsule is filled and sealed, by a process of chemical etching or mechanical scribing. The presently preferred technique is to form the lines of weakness 24 by using the same laser inscription technique which recently has become conventional for inscribing ownership-indicating identification markings on gem stones. A comprehensive network of laser inscription lines 24 is shown formed on the capsule in FIG. 1, and a typical one is shown in section at a larger scale in FIG. 3.

The second major component of the product 10, as indicated above, is the hanger 14.

In the instance depicted, the filled capsule 12 takes the form of a prolate spheroid or ovoid and the hanger 14 takes the form of a circular band 26 with a tangentially extending tail 28, e.g. the "police whistle"-shape of a lower-case sigma. This hanger 14 may be generated by snuggly winding a strip of hanger material 30 convolutely slightly more than once about the girth of the filled capsule 12, fastening (e.g. gluing) it to itself in the overlap, at 32, and leaving the tail 28 free. The hanger material 30 may be made of paper tape such as is used for pre-punching messages to be sent on telex machines, or for ticker tape; surgical or wound-dressing tape; sheet plastic strip with pressure sensitive adhesive on one side, such as is used in the manufacture of Bandaid, Curad and similar brands of such consumer products. By strong preference, the tape material 30 of the hanger 14 is very foraminous, i.e. covered with perforations 31, at least over the whole area of its circular band portion 26, so that when the filled capsule 12 is crushed, adhesive may flow out through the hanger, as well as out through the end regions where the broken capsule was not covered by the hanger. In other words it is preferred that the hanger 14 not form a significant barrier to the dispersion of the adhesive as the capsule is broken.

The tape material 30 preferably is kept as narrow as possible, e.g. being about a third as wide as the capsule is long. An especially long capsule could be similarly provided with two or more such hangers 14 spaced along its length. Each hanger 14 can be created in place, as described, or it could be preformed on a mandrel and later slipped onto the capsule either by the manufacturer or by the user.

In any event, the purpose of the hanger 14 is to temporarily fasten the filled capsule 12 onto the respective surface of one of the two objects which are to be adhered together using the product 10. Such a use is depicted in FIGS. 2 and 4, which respectively show the situation prior to and subsequent to crushing of the adhesive-filled capsule 12.

In the typical situation shown in FIG. 2, the object 40 is a building stud, already installed, having an accessible outer surface 42. The object 44 is a structural and/or decorative panel, e.g. of plywood, particle board, acoustical tile, other composition board or the like, having an inner surface 46. An objective in completing the physical structure of which the object 40 is a part, is to mount the object 44 to the object 40 so that it, too, becomes a part of the same physical structure.

Accordingly, the first step is to mount the product 10 on either the surface 42 of the object 40 or on the surface 46 of the object 44. In most instances it will be easier to do the former than the latter, but either is possible. For instances where the object 44 is heavy, broad, tall or its surface 46 has a large area, it may be preferred to use several of the products 10 to mount the object to the structure represented by the object 40. In that case, strictly speaking, the one object 44 may need to be simultaneously fastened to a plurality of objects 40. That would be the case, for instance, when one four by eight foot sheet of plywood panelling needed to be fastened across four or eight wall studs. In that instance, one or more of the products 10 would be first mounted on each of the wall studs.

There are many convenient ways that the hanger 14 of a product 10 could be fastened on the surface 42 of the object 40. What is shown in FIG. 2 is that the tail 28 of the hanger 14 has been tacked to the stud 40, e.g. using a thumb tack 52, brad, staple or the like.

When in each individual product 10 that is going to be used is so mounted in place, the object 44 is brought into confronting relation and proper alignment, as shown in FIG. 2. Then the object 44 is pressed toward the object 40, causing each capsule 12 to be crushed, fractured, smashed, disintegrated or the like, with a resultant all-direction, two-dimensional splattering of its liquid adhesive contents much in the pattern that a fresh egg in the shell makes when it is dropped onto a sidewall. All of the products 10 may be smashed simultaneously by comprehensively pushing all of the object 44 towards the object 40, or they may be smashed serially, e.g. by tapping on the exposed outer face 47 of the object 44, e.g. using a hammer 50. In any event, as the capsule is or capsules are smashed, and the adhesive is thus released and flattened into a thin film, the object 44 becomes adhered facewise to the object 40 (FIG. 4).

As the adhesive is released from the smashed capsule, some of it will flow into and through the material 30 of the hanger 14, so that even though the hanger material 30 remains in the interface of the joint there is not potential weakness, e.g. represented by a possibility of tearing or delamination of the hanger material.

Figure 5:
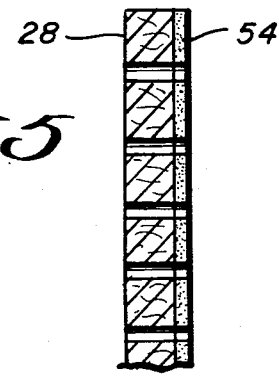
FIG. 5 is a fragmentary vertical cross-sectional view showing a capsule hanger of a modified form.

FIG. 5 depicts a variation where the hanger 14 is equipped to be fastened to the object 40 by having one face of its tail 28 provided with a layer 54 of conventional pressure sensitive adhesive, e.g. much as a BandAid strip. And this layer may initially be provided with a strip-off cover sheet (not shown), much in the way that BandAid strips are. The layer 54 may function in place of or in addition to the mechanical fastener 52 of FIG. 2.

Figure 6:
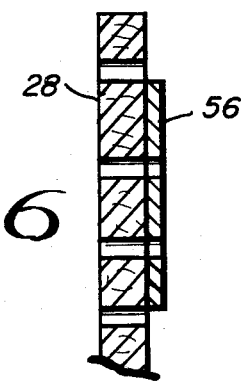
FIG. 6 is a fragmentary vertical cross-sectional view showing a capsule hanger of another modified form.

FIG. 6 depicts a variation where the hanger 14 is equipped to be fastened to a ferromagnetic object 40 by having one face of its tail 28 provided with a layer 56 of permanent magnet coating material, e.g. such as is used on the backs of "magnetic darts" and on the backs of the similar magnetized objects that people use to post notes to themselves and others on their refrigerator doors.

The hanger 14 as shown is in its preferred form. However, it could have other forms, such as a tube of thermoplastic netting of the type used for bagging grapes at the supermarket, or a spot coating of pressure sensitive adhesive directly on one side of the capsule 12, or a small shot pellet-like permanent magnet encapsulated within the capsule 12, i.e. in the quantum of liquid adhesive. Or the adhesive-filled capsule 12 could be placed against the respective surface 42 of the object 40 and a small piece of ordinary Scotch Brand Magic transparent tape or the like sufficiently used as a hanger to tape the capsule temporarily in place.

It should now be apparent that the surface-fastened frangible adhesive capsule as described hereinabove, possesses each of the atributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A surface-fastenable adhesive capsule product for use in adhering two objects together in a face-to-face manner,
   said product comprising:
   a closed, frangible capsule containing a filling of liquid adhesive capable of adhering to respective faces of both of the objects; and
   a hanger means carried by said adhesive-containing capsule and constructed and arranged for temporarily securing the adhesive-containing capsule to one of the objects with the adhesive-containing capsule disposed on the respective face of that object, so that after the adhesive-containing capsule has been temporarily secured to the one object, the other object may be brought into face-to-face confronting relation with the one object and the objects pressed together causing the adhesive-containing capsule to smash, and the adhesive to become released and spread between the two pressed-together objects, adhering the two objects together;
   said hanger means being disposed externally of the capsule;
   said hanger means being constituted by a relatively narrow band convolutely wrapped about the capsule at least once and including means by which said band may be temporarily fastened to the one object;
   the last-mentioned said means comprising an integral tail of said band;
   said band being foraminous so that as the capsule is smashed some of the adhesive may flow through the hanger means;
   the capsule being constituted by thin, brittle wall means;
   said wall means being provided with a widely distributed network of lines of weakness so that as the capsule is smashed it comprehensively disintegrates;
   said lines of weakness being constituted by a pattern of grooves in said wall means; and
   the adhesive being one which sets in a matter of seconds when exposed to air.

2. The product of claim 1, further including:
   a mechanical fastener constructed and arranged to be driven through the tail into the one object for temporarily securing the product to the one object.

3. The product of claim 1, further including:
   a layer of pressure-sensitive adhesive provided on said tail, this layer being constructed and arranged for sticking to the one object for temporarily securing the product to the one object.

4. The product of claim 1, further including:
   a layer of permanent magnet material provided on said tail, this layer being constructed and arranged for magnetic attraction to the one object for temporarily securing the product to the one object.

5. The product of claim 1, wherein:
   said lines of weakness are constituted by a laser inscription on said wall means.

6. A method for adhering two objects together in a face-to-face manner, comprising:
   providing a closed, frangible capsule constituted by a thin, brittle wall containing a filling of liquid adhesive capable of adhering to respective faces of both of the objects and which sets in a matter of seconds when exposed to air;
   providing said thin brittle wall with a pattern of grooves constituting a widely distributed network of lines of weakness so that as the capsule is smashed it will comprehensively disintegrate;
   providing a hanger constituted by a relatively narrow band of foraminous material through which some of said adhesive may flow as the capsule is smashed;
   connecting said hanger to the adhesive containing capsule by wrapping the relatively narrow band externally convolutely about the capsule at least once, leaving an integral tail portion for use in temporarily fastening the capsule to one of said objects;

temporarily hangingly securing the adhesive-containing capsule onto a respective face of one of the objects using the hanger tail;

bringing the other object into face-to-face confronting relation with the one object; and pressing the objects together so as to cause the adhesive-containing capsule to smash, and the adhesive to become released and spread between the two pressed-together objects, adhering the two objects together.

7. The method of claim 6, wherein:
the groove lines of weakness are provided by laser inscription of the capsule.

8. The method of claim 6, wherein:
the pressing step is conducted by tapping on the outside of the other of the two objects while the one object remains stationary.

* * * * *